United States Patent
Takenaka et al.

(10) Patent No.: US 12,529,119 B2
(45) Date of Patent: Jan. 20, 2026

(54) METHOD OF PRODUCING HOT-ROLLED STEEL SHEET FOR GRAIN-ORIENTED ELECTRICAL STEEL SHEET AND METHOD OF PRODUCING GRAIN-ORIENTED ELECTRICAL STEEL SHEET

(71) Applicant: JFE STEEL CORPORATION, Tokyo (JP)

(72) Inventors: Masanori Takenaka, Tokyo (JP); Minoru Takashima, Tokyo (JP); Yukihiro Matsubara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 429 days.

(21) Appl. No.: 17/663,022

(22) Filed: May 12, 2022

(65) Prior Publication Data

US 2022/0267871 A1    Aug. 25, 2022

Related U.S. Application Data

(62) Division of application No. 16/320,612, filed as application No. PCT/JP2017/026904 on Jul. 25, 2017, now abandoned.

(30) Foreign Application Priority Data

Jul. 29, 2016   (JP) .................. 2016-150166

(51) Int. Cl.
   *C21D 8/12*        (2006.01)
   *C22C 38/00*       (2006.01)
   (Continued)

(52) U.S. Cl.
   CPC ............. *C21D 8/1233* (2013.01); *C21D 8/12* (2013.01); *C21D 8/1222* (2013.01);
   (Continued)

(58) Field of Classification Search
   CPC ...... C21D 8/12; C21D 8/1222; C21D 8/1233; C21D 8/1255; C21D 8/1272; C22C 38/00;
   (Continued)

(56) References Cited

U.S. PATENT DOCUMENTS

| | | |
|---|---|---|
| 1,965,559 A | 7/1934 | Goss |
| 3,932,234 A | 1/1976 | Imanaka et al. |

(Continued)

FOREIGN PATENT DOCUMENTS

| | | |
|---|---|---|
| CN | 1203635 A | 12/1998 |
| CN | 104220607 A | 12/2014 |

(Continued)

OTHER PUBLICATIONS

Aug. 11, 2020, Office Action issued by the Korean Intellectual Property Office in the corresponding Korean Patent Application No. 10-2019-7005991 with English language concise statement of relevance.

(Continued)

*Primary Examiner* — Jenny R Wu
(74) *Attorney, Agent, or Firm* — KENJA IP LAW PC

(57) ABSTRACT

Provided is a method of producing a hot-rolled steel sheet for a grain-oriented electrical steel sheet. The method comprising: preparing a steel slab having a chemical composition containing, by mass %, C: 0.002% or more and 0.080% or less, Si: 2.00% or more and 8.00% or less, Mn: 0.02% or more and 0.50% or less, acid-soluble Al: 0.003% or more and less than 0.010%, and at least one of S or Se: 0.001% or more and 0.010% or less in total, with N limited to less than 0.006%, and the balance being Fe and inevitable impurities; heating the steel slab to 1300° C. or lower; and subjecting the steel slab to hot rolling, wherein a friction coefficient in final pass of the hot rolling is 0.35 or less.

8 Claims, 1 Drawing Sheet

(51) Int. Cl.

| | |
|---|---|
| *C22C 38/04* | (2006.01) |
| *C22C 38/06* | (2006.01) |
| *C22C 38/34* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/60* | (2006.01) |
| *H01F 1/10* | (2006.01) |
| *H01F 1/16* | (2006.01) |

(52) U.S. Cl.
CPC ......... *C21D 8/1255* (2013.01); *C21D 8/1272* (2013.01); *C22C 38/00* (2013.01); *C22C 38/008* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/60* (2013.01); *H01F 1/16* (2013.01); *Y02P 10/20* (2015.11)

(58) Field of Classification Search
CPC ....... C22C 38/008; C22C 38/04; C22C 38/06; C22C 38/34; C22C 38/42; C22C 38/44; C22C 38/46; C22C 38/48; C22C 38/50; C22C 38/60; H01F 1/16; Y02P 10/20
See application file for complete search history.

(56) References Cited

U.S. PATENT DOCUMENTS

| | | | |
|---|---|---|---|
| 4,979,997 A | 12/1990 | Kobayashi et al. | |
| 5,346,559 A * | 9/1994 | Ushigami | C21D 8/1233 148/112 |
| 5,667,598 A | 9/1997 | Ozaki et al. | |
| 6,309,473 B1 | 10/2001 | Hayakawa et al. | |
| 6,500,278 B1 * | 12/2002 | Abiko | C22C 38/001 148/120 |
| 8,177,920 B2 | 5/2012 | Shingaki et al. | |
| 2012/0222777 A1 | 9/2012 | Fortunati et al. | |
| 2015/0318094 A1 * | 11/2015 | Shingaki | H01F 1/16 148/307 |
| 2015/0332822 A1 | 11/2015 | Takenaka et al. | |
| 2017/0260600 A1 * | 9/2017 | Okubo | C22C 38/005 |
| 2017/0321296 A1 | 11/2017 | Hayakawa et al. | |

FOREIGN PATENT DOCUMENTS

| | | | |
|---|---|---|---|
| EP | 0875586 A1 | 11/1998 | |
| EP | 1004680 A1 | 5/2000 | |
| EP | 2940159 A1 | 11/2015 | |
| JP | S4015644 B | 7/1965 | |
| JP | S5113469 B | 4/1976 | |
| JP | H1096028 A * | 4/1998 | ............... C21D 8/12 |
| JP | 2782086 B2 | 7/1998 | |
| JP | 2000129356 A | 5/2000 | |
| JP | 2004010986 A * | 1/2004 | |
| JP | 2006241503 A | 9/2006 | |
| JP | 4593317 B2 | 12/2010 | |
| JP | 2011143440 A | 7/2011 | |
| JP | 2012036454 A | 2/2012 | |
| JP | 2012184497 A | 9/2012 | |
| JP | 2015190022 A | 11/2015 | |
| RU | 2398894 C1 | 9/2010 | |
| RU | 2536150 C2 | 12/2014 | |
| WO | 9720956 A1 | 6/1997 | |
| WO | 2006059740 A1 | 6/2006 | |
| WO | 2016084378 A1 | 6/2016 | |

OTHER PUBLICATIONS

Chen Zhuo-Lei et al., Study on Assembling Properties of Non-oriented Silicon Sheets, Electrical Engineering Materials, 2007, pp. 19-23.

Feb. 19, 2019, Notification of Reasons for Refusal issued by the Japan Patent Office in the corresponding Japanese Patent Application No. 2018-529922 with English language concise statement of relevance.

Jul. 4, 2019, the Extended European Search Report issued by the European Patent Office in the corresponding European Patent Application No. 17834334.9.

May 19, 2020, Notification of Reasons for Refusal issued by the Japan Patent Office in the corresponding Japanese Patent Application No. 2019-080929 with English language concise statement of relevance.

May 19, 2020, Office Action issued by the China National Intellectual Property Administration in the corresponding Chinese Patent Application No. 201780046280.1 with English language search report.

May 26, 2020, Office Action issued by the Federal Service for Intellectual Property, Patents and Trademarks of the Russian Federation in the corresponding Russian Patent Application No. 2020102494 with English language search report.

Oct. 24, 2017, International Search Report issued in the International Patent Application No. PCT/JP2017/026904.

Oct. 3, 2019, Office Action issued by the Federal Service for Intellectual Property, Patents and Trademarks of the Russian Federation in the corresponding Russian Patent Application No. 2019105261 with English language search report.

Y. Ushigami et al., Precipitation Behaviors of Injected Nitride Inhibitors during Secondary Recrystallization Annealing in Grain Oriented Silicon Steel, Materials Science Forum, 1996, pp. 593-598, vols. 204-206.

* cited by examiner

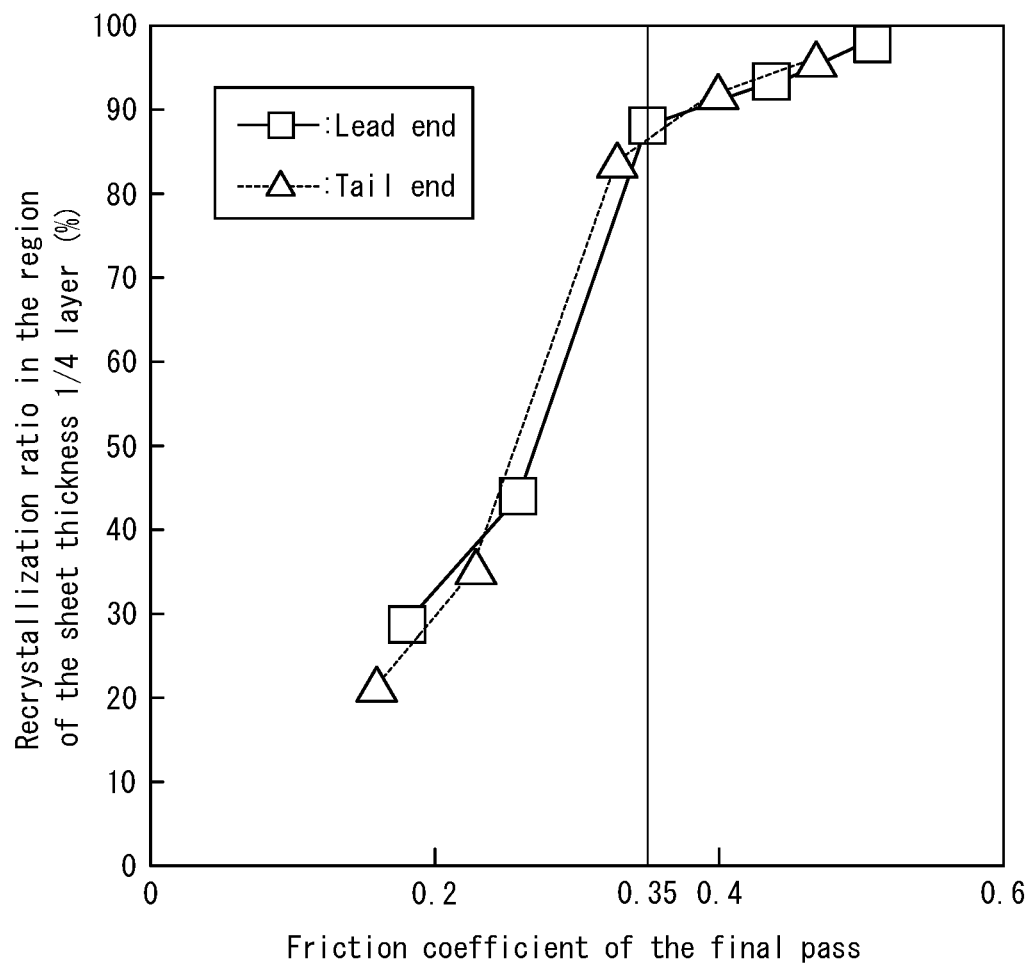

METHOD OF PRODUCING HOT-ROLLED STEEL SHEET FOR GRAIN-ORIENTED ELECTRICAL STEEL SHEET AND METHOD OF PRODUCING GRAIN-ORIENTED ELECTRICAL STEEL SHEET

CROSS-REFERENCE TO RELATED APPLICATIONS

The present application is a divisional application of U.S. patent application Ser. No. 16/320,612 filed Jan. 25, 2019, which is a National Stage Application of PCT/JP2017/026904 filed Jul. 25, 2017, which claims priority of Japanese Patent Application No. 2016-150166 filed Jul. 29, 2016. The disclosures of the prior applications are hereby incorporated by reference herein in their entirety.

TECHNICAL FIELD

This disclosure relates to a hot-rolled steel sheet for a grain-oriented electrical steel sheet which is used to produce a grain-oriented electrical steel sheet, a method of producing the hot-rolled steel sheet for a grain-oriented electrical steel sheet, and a method of producing a grain-oriented electrical steel sheet.

BACKGROUND

A grain-oriented electrical steel sheet is a soft magnetic material mainly used as an iron core material of an electrical device such as a transformer or a generator, and has crystal texture in which the <001> orientation which is the easy magnetization axis of iron is highly aligned with the rolling direction of the steel sheet. Such texture is formed through secondary recrystallization of preferentially causing the growth of giant crystal grains in the (110)[001] orientation which is called Goss orientation, when secondary recrystallization annealing is performed in the processes of producing the grain-oriented electrical steel sheet.

Conventional processes of producing such a grain-oriented electrical steel sheet are as follows. A slab containing about 3 mass % Si and inhibitor components such as MnS, MnSe, and MN is heated at a temperature exceeding 1300° C. to dissolve the inhibitor components. The slab is then hot rolled, and optionally hot band annealed. Subsequently, the sheet is cold rolled once, or twice or more with intermediate annealing performed therebetween, to obtain a cold-rolled sheet with a final sheet thickness. The cold-rolled sheet is then subjected to primary recrystallization annealing in a wet hydrogen atmosphere, to perform primary recrystallization and decarburization. Subsequently, the sheet is applied with an annealing separator mainly composed of magnesia (MgO), and then subjected to final annealing at 1200° C. for about 5 hours to develop secondary recrystallization and purify the inhibitor components (for example, U.S. Pat. No. 1,965,559 A (PTL 1), JP S40-15644 B2 (PTL 2), JP S51-13469 B2 (PTL 3)).

As mentioned above, the conventional processes of producing a grain-oriented electrical steel sheet include containing precipitate s (inhibitor components) such as MnS, MnSe, and MN in a slab, heating the slab at a high temperature exceeding 1300° C. to dissolve the inhibitor components, and finely precipitating the inhibitors component in a subsequent process to develop secondary recrystallization.

That is to say, slab heating at a high temperature exceeding 1300° C. is necessary in the conventional processes of producing a grain-oriented electrical steel sheet, which causes very high production costs. The conventional processes thus have a problem of failing to meet the recent demands to reduce production costs.

To solve this problem, for example, JP 2782086 B2 (PTL 4) proposes a method of containing acid-soluble Al (sol.Al) in an amount of 0.010% to 0.060% and, while limiting slab heating to a low temperature, performing nitriding in an appropriate nitriding atmosphere in a decarburization annealing process so that (Al, Si)N is precipitated and used as an inhibitor in secondary recrystallization.

In this case, (Al, Si)N disperses finely in the steel and functions as an effective inhibitor, and precipitates ($Si_3N_4$ or (Si, Mn)N) mainly composed of silicon nitride only form in the surface layer of the steel sheet after the nitriding treatment of the aforementioned production method. In the subsequent secondary recrystallization annealing, the precipitates mainly composed of silicon nitride change to Al-containing nitride ((Al, Si)N or AlN) which is more thermodynamically stable. According to Y. Ushigami et al. "Precipitation Behaviors of Injected Nitride Inhibitors during Secondary Recrystallization Annealing in Grain Oriented Silicon Steel" Materials Science Forum Vols. 204-206 (1996) pp. 593-598 (NPL 1), $Si_3N_4$ in the vicinity of the surface layer dissolves with the temperature rising in the secondary recrystallization annealing; on the other hand, nitrogen diffuses into the steel and, when the temperature exceeds 900° C., precipitates as substantially uniform Al-containing nitride in the sheet thickness direction to provide a grain growth inhibiting capability (inhibition effect) throughout the sheet thickness. With this technique, the same amount and grain size of precipitate can be obtained in the sheet thickness direction relatively easily, as compared with the precipitate dispersion control using high-temperature slab heating.

Furthermore, JP 4593317 B2 (PTL 5) describes that, by leaving non-recrystallized texture in ¼ area of the surface layer of a hot-rolled sheet and performing cold rolling without hot band annealing, primary recrystallization preferentially develops in the {411}<148> orientation, and good magnetic properties can be obtained.

Meanwhile, a technique of developing secondary recrystallization without containing any inhibitor component in the slab from the beginning is also under study. For example, JP 2000-129356 A (PTL 6) describes a technique (inhibitorless method) that enables secondary recrystallization without containing any inhibitor component.

CITATION LIST

Patent Literature

PTL 1: U.S. Pat. No. 1,965,559 A
PTL 2: JP S40-15644 B2
PTL 3: JP S51-13469 B2
PTL 4: JP 2782086 B2
PTL 5: JP 4593317 B2
PTL 6: JP 2000-129356 A

Non-Patent Literature

NPL 1: Y. Ushigami et al. "Precipitation Behaviors of Injected Nitride Inhibitors during Secondary Recrystallization Annealing in Grain Oriented Silicon Steel" Materials Science Forum Vols. 204-206 (1996) pp. 593-598

SUMMARY

Technical Problem

The aforementioned inhibitorless method requires no high-temperature slab heating, and is therefore an excellent method in terms of costs and productivity. However, a low slab heating temperature always leads to a reduction in rolling temperature in the hot rolling. With such a reduction in hot rolling temperature, strains are more likely to accumulate in the surface layer of the steel sheet during the hot rolling, and the surface layer of the hot-rolled sheet is more likely to be recrystallized. As a result, the surface layer of the produced hot-rolled sheet is completely recrystallized. The recrystallized grains in the surface layer of such a hot-rolled sheet are very fine, and will cause occurrence of abnormal grain growth during the subsequent hot band annealing process. As a result, the uniformity of the recrystallized texture in the sheet thickness direction of the hot-rolled and annealed sheet decreases, and the magnetic properties vary largely in the coil of the steel sheet after final annealing.

It could thus be helpful to provide, by performing an appropriate hot rolling process under predetermined conditions, a hot-rolled steel sheet for a grain-oriented electrical steel sheet where the magnetic properties vary less in the coil of the steel sheet after final annealing.

It could also be helpful to provide a method of producing a grain-oriented electrical steel sheet with high productivity and low costs, which requires no high-temperature slab heating. With this method, it is possible to reduce the variations in magnetic properties in the coil of the final product.

Solution to Problem

We have made intensive studies to solve the aforementioned problems. As a result, we discovered that by mutually regulating the contents of component elements sol.Al, S and Se in minute amount regions below their conventionally recognized contents for functioning as inhibitors, the normal grain growth inhibiting capability can be obtained even with slab heating in a low-temperature region of 1300° C. or lower, which contributes to the improvement in magnetic properties.

We also discovered that, by using a hot-rolled steel sheet where the recrystallization ratio in a region from the steel sheet surface (the outermost surface layer or the bottommost surface layer) to a depth of ¼ the sheet thickness (hereinafter referred to as "sheet thickness ¼ layer") is 90% or less, the variations in magnetic properties in the coil of a grain-oriented electrical steel sheet, which is the final product, can be reduced. The "recrystallization ratio" here is obtained by measuring the recrystallization ratio in a region from the outermost surface layer of the steel sheet to a depth of ¼ the sheet thickness and the recrystallization ratio in a region from the bottommost surface layer of the steel sheet to a depth of ¼ the sheet thickness, and taking the larger one as the result.

Rolling with weak lubrication and high friction coefficient is commonly used in the hot rolling process to prevent wear and roughening of the rollers and to suppress slipping and defective biting. In such a hot rolling process, regulating the sheet thickness, tension, and supplying amount of lubricant can regulate the friction coefficient in the final pass, and reducing the friction coefficient to a value lower than a conventional one, specifically to 0.35 or less, can regulate the recrystallization ratio in the region of the sheet thickness ¼ layer of the hot-rolled steel sheet to 90% or less. We discovered that in this way, the variations in magnetic properties in the coil of a grain-oriented electrical steel sheet, which is the steel sheet after final annealing, can be reduced.

The following describes the experiments on which the aforementioned discoveries are based. Steel slabs with a thickness of 220 mm having the respective chemical compositions listed in Table 1 were each heated to 1250° C., and then hot rolled to a thickness of 2.4 mm. The friction coefficient was regulated by regulating, for example, the supplying amount of lubricant in the final pass of the hot rolling. The friction coefficient was calculated based on Orowan's theory using rolling records such as rolling load, sheet thickness, tension and roller size, and deformation resistance calculated from, for example, rolling temperature. The value is listed in Table 1.

TABLE 1

| No. | Chemical composition (mass %) | | | | | | | Friction coefficient of final pass | | Recrystallization ratio of sheet thickness ¼ layer (%) | | Magnetic properties of product sheet $W_{17/50}$ (W/kg) | | | Remarks |
| | Si | C | Mn | sol.Al | N | S | Se | Lead end | Tail end | Lead end | Tail end | Hot rolled lead end | Hot rolled tail end | Lead end − Tail end | |
| --- | --- | --- | --- | --- | --- | --- | --- | --- | --- | --- | --- | --- | --- | --- | --- |
| 1 | 3.26 | 0.051 | 0.07 | 0.008 | 0.004 | 0.006 | 0 | 0.18 | 0.16 | 29 | 22 | 0.83 | 0.80 | 0.03 | Example |
| 2 | 3.41 | 0.043 | 0.08 | 0.008 | 0.005 | 0.005 | 0.002 | 0.26 | 0.23 | 44 | 36 | 0.81 | 0.80 | 0.01 | Example |
| 3 | 3.65 | 0.058 | 0.08 | 0.007 | 0.004 | 0.002 | 0 | 0.35 | 0.33 | 88 | 84 | 0.77 | 0.77 | 0.00 | Example |
| 4 | 3.40 | 0.061 | 0.09 | 0.008 | 0.005 | 0.005 | 0.005 | 0.30 | 0.28 | 61 | 43 | 0.82 | 0.81 | 0.01 | Example |
| 5 | 3.77 | 0.064 | 0.09 | 0.009 | 0.004 | 0.007 | 0.005 | 0.31 | 0.30 | 50 | 41 | 0.96 | 0.96 | 0.00 | Comparative example |
| 6 | 3.35 | 0.055 | 0.09 | 0.012 | 0.005 | 0.002 | 0 | 0.26 | 0.25 | 43 | 30 | 1.19 | 1.24 | −0.05 | Comparative example |
| 7 | 3.36 | 0.044 | 0.09 | 0.008 | 0.004 | 0.002 | 0.001 | 0.44 | 0.40 | 93 | 92 | 1.02 | 0.82 | 0.20 | Comparative example |
| 8 | 3.29 | 0.032 | 0.07 | 0.007 | 0.003 | 0.004 | 0.005 | 0.51 | 0.47 | 98 | 96 | 1.05 | 0.83 | 0.22 | Comparative example |

Furthermore, samples were cut from the central portion in the width direction of the lead and tail ends of the hot-rolled coil, and the recrystallization ratio was measured by electron backscatter diffraction method (EBSD) throughout the thickness of a cross section in the transverse direction (direction orthogonal to the rolling direction) (TD cross section). The measurement by EBSD was performed under the condition of 1 μm pitch. The data were analyzed with OIM analysis made by TexSEM Laboratories Inc. An interface with a misorientation angle of 15° or more was defined as a crystal grain boundary, a grain with a grain orientation spread (the average value of misorientation angles between one measurement point and all the other measurement points in the same crystal grain) within 3° was regarded as a recrystallized grain, and the area ratio of the recrystallized grains in the region of the sheet thickness ¼ layer of the hot-rolled steel sheet was measured. The results are listed in Table 1. FIG. 1 illustrates the relationship between the recrystallization ratio in the region of the sheet thickness ¼ layer of the hot-rolled steel sheet and the friction coefficient in the final pass of the hot rolling based on the results listed in Table 1.

The hot-rolled coils were each hot band annealed at 1050° C. for 60 seconds, then cold rolled to a thickness of 0.27 mm, and then subjected to primary recrystallization annealing at 820° C. for 120 seconds. The heating rate between 500° C. and 700° C. in the primary recrystallization annealing was 200° C./s.

Subsequently, an annealing separator mainly composed of MgO was applied to the surface of each steel sheet, and then the steel sheets were subjected to secondary recrystallization annealing serving also as purification annealing at 1200° C. for 10 hours. Following this, a phosphate-based insulating tension coating was applied to and baked on each steel sheet, and flattening annealing was performed for the purpose of flattening the steel strips, to obtain products. The results of examining the magnetic properties of each product sheet obtained in this way are listed in Table 1.

As indicated in Table 1, the normal grain growth inhibiting capability can be obtained even with slab heating in a low-temperature region of 1300° C. or lower by regulating the contents of sol.Al, S and Se in a predetermined amount. In this way, the magnetic properties can be improved.

Furthermore, it is understood from Table 1 and FIG. 1 that when the friction coefficient in the final pass of the hot rolling is 0.35 or less, the recrystallization ratio in the region of the sheet thickness ¼ layer of the hot-rolled steel sheet is 90% or less. Moreover, it is understood from the results listed in Table 1 that the variations in magnetic properties (iron loss) between the lead end and the tail end of the product sheet during the hot rolling is reduced when the recrystallization ratio in the region of the sheet thickness ¼ layer is 90% or less.

As described above, when the friction coefficient in the final pass of the hot rolling is 0.35 or less, the recrystallization ratio in the region of the sheet thickness ¼ layer of the hot-rolled steel sheet can be 90% or less, and the variations in magnetic properties of the steel sheet after final annealing can be significantly reduced.

We thus provide the following.

1. A hot-rolled steel sheet for a grain-oriented electrical steel sheet, comprising:
   a chemical composition containing (consisting of), by mass %,
   C: 0.002% or more and 0.080% or less,
   Si: 2.00% or more and 8.00% or less,
   Mn: 0.02% or more and 0.50% or less,
   acid-soluble Al: 0.003% or more and less than 0.010%, and
   at least one of S or Se: 0.001% or more and 0.010% or less in total,
   with N limited to less than 0.006%, and the balance being Fe and inevitable impurities, wherein
   regions from an outermost surface layer and a bottommost surface layer to a depth of ¼ sheet thickness have a recrystallization ratio of 90% or less.

2. The hot-rolled steel sheet for a grain-oriented electrical steel sheet according to 1., wherein the chemical composition further contains at least one selected from, by mass %,
   Ni: 0.005% or more and 1.5% or less,
   Cu: 0.005% or more and 1.5% or less,
   Sb: 0.005% or more and 0.5% or less,
   Sn: 0.005% or more and 0.5% or less,
   Cr: 0.005% or more and 0.1% or less,
   P: 0.005% or more and 0.5% or less,
   Mo: 0.005% or more and 0.5% or less,
   Ti: 0.0005% or more and 0.1% or less,
   Nb: 0.0005% or more and 0.1% or less,
   V: 0.0005% or more and 0.1% or less,
   B: 0.0002% or more and 0.0025% or less,
   Bi: 0.005% or more and 0.1% or less,
   Te: 0.0005% or more and 0.01% or less, and
   Ta: 0.0005% or more and 0.01% or less.

3. A hot-rolled and annealed sheet for a grain-oriented electrical steel sheet, comprising:
   a chemical composition containing (consisting of), by mass %,
   C: 0.002% or more and 0.080% or less,
   Si: 2.00% or more and 8.00% or less,
   Mn: 0.02% or more and 0.50% or less,
   acid-soluble Al: 0.003% or more and less than 0.010%, and
   at least one of S or Se: 0.001% or more and 0.010% or less in total,
   with N limited to less than 0.006%, and the balance being Fe and inevitable impurities, wherein
   an average recrystallized grain size in regions from an outermost surface layer and a bottommost surface layer to a depth of ¼ sheet thickness is three times or less an average recrystallized grain size in regions from a center of the sheet thickness to a length of less than ¼ sheet thickness in directions to the outermost surface layer and the bottommost surface layer.

4. The hot-rolled and annealed sheet for a grain-oriented electrical steel sheet according to 3., wherein the chemical composition further contains at least one selected from, by mass %,
   Ni: 0.005% or more and 1.5% or less,
   Cu: 0.005% or more and 1.5% or less,
   Sb: 0.005% or more and 0.5% or less,
   Sn: 0.005% or more and 0.5% or less,
   Cr: 0.005% or more and 0.1% or less,
   P: 0.005% or more and 0.5% or less,
   Mo: 0.005% or more and 0.5% or less,
   Ti: 0.0005% or more and 0.1% or less,
   Nb: 0.0005% or more and 0.1% or less,
   V: 0.0005% or more and 0.1% or less,
   B: 0.0002% or more and 0.0025% or less,
   Bi: 0.005% or more and 0.1% or less,
   Te: 0.0005% or more and 0.01% or less, and
   Ta: 0.0005% or more and 0.01% or less.

5. A method of producing a hot-rolled steel sheet for a grain-oriented electrical steel sheet, comprising:

preparing a steel slab having a chemical composition containing (consisting of), by mass %,
C: 0.002% or more and 0.080% or less,
Si: 2.0% or more and 8.0% or less,
Mn: 0.02% or more and 0.50% or less,
acid-soluble Al: 0.003% or more and less than 0.010%, and
at least one of S or Se: 0.001% or more and 0.010% or less in total,
with N limited to less than 0.006%, and the balance being Fe and inevitable impurities;
heating the steel slab to 1300° C. or lower; and
subjecting the steel slab to hot rolling, wherein a friction coefficient in final pass of the hot rolling is 0.35 or less.

6. The method of producing a hot-rolled steel sheet for a grain-oriented electrical steel sheet according to 5., wherein the chemical composition further contains at least one selected from, by mass %,
Ni: 0.005% or more and 1.5% or less,
Cu: 0.005% or more and 1.5% or less,
Sb: 0.005% or more and 0.5% or less,
Sn: 0.005% or more and 0.5% or less,
Cr: 0.005% or more and 0.1% or less,
P: 0.005% or more and 0.5% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

7. A method of producing a grain-oriented electrical steel sheet, comprising:
preparing a hot-rolled steel sheet with the method of producing a hot-rolled steel sheet for a grain-oriented electrical steel sheet according to 5. or 6.;
subjecting the hot-rolled steel sheet to hot band annealing, and to cold rolling once, or twice or more with intermediate annealing performed therebetween, to obtain a cold-rolled steel sheet with a final sheet thickness;
subjecting the cold-rolled steel sheet to primary recrystallization annealing;
applying an annealing separator to a surface of the cold-rolled steel sheet after subjection to the primary recrystallization annealing; and
then subjecting the cold-rolled steel sheet to secondary recrystallization annealing.

Advantageous Effect

According to this disclosure, it is possible to obtain a hot-rolled steel sheet and a grain-oriented electrical steel sheet with high productivity and low costs, where no high-temperature slab heating is required. Additionally, it is possible to reduce the variations in magnetic properties in the coil of the final product.

BRIEF DESCRIPTION OF THE DRAWINGS

In the accompanying drawing:
FIG. 1 illustrates the relationship between the recrystallization ratio in the region of the sheet thickness ¼ layer of a hot-rolled steel sheet and the friction coefficient in the final pass of hot rolling.

DETAILED DESCRIPTION

The following describes a method of producing a hot-rolled steel sheet and a grain-oriented electrical steel sheet according to an embodiment of this disclosure. The reasons for limiting the chemical composition of steel are described first. In this specification, "%" indicating the content (amount) of each component element denotes "mass %" unless otherwise noted.

C: 0.002% or More and 0.080% or Less

When the C content is less than 0.002%, the grain boundary strengthening effect produced by C is lost, and slab cracking and other problems appear to hamper the production. On the other hand, when the C content is more than 0.080%, it is difficult to reduce C by decarburization annealing to an amount of 0.005% or less at which no magnetic aging occurs. Therefore, the C content is set to a range of 0.002% or more and 0.080% or less. The C content is preferably 0.020% or more and 0.070% or less.

Si: 2.00% or More and 8.00% or Less

Si is a very effective element in increasing electrical resistance of steel and reducing eddy current loss which constitutes a part of iron loss. When adding Si to the steel sheet, the electrical resistance monotonically increases until the Si content reaches 11%, yet a Si content more than 8.00% remarkably deteriorates the workability. On the other hand, when the Si content is less than 2.00%, the electrical resistance is too low to obtain good iron loss properties. Therefore, the Si content is set to 2.00% or more and 8.00% or less. The Si content is preferably 2.50% or more and 4.50% or less.

Mn: 0.02% or More and 0.50% or Less

Mn combines with S or Se to form MnS or MnSe. Such MnS or MnSe, even in a minute amount, acts with a grain boundary segregation element and inhibits normal grain growth in the heating process of the secondary recrystallization annealing. However, when the Mn content is less than 0.02%, the normal grain growth inhibiting capacity is insufficient. On the other hand, when the Mn content exceeds 0.50%, high-temperature slab heating is required in the slab heating process before hot rolling in order to completely dissolve Mn, and moreover, the normal grain growth inhibiting capacity is decreased due to coarse precipitation of MnS or MnSe. Therefore, the Mn content is set to 0.02% or more and 0.50% or less. The Mn content is preferably 0.05% or more and 0.20% or less.

S and/or Se: 0.001% or More and 0.010% or Less in Total

S and Se combine with Mn to form an inhibitor. However, when the total content of one or more selected from S and Se is less than 0.001%, the absolute amount of inhibitor is insufficient, and therefore the normal grain growth inhibiting capacity is insufficient. On the other hand, when the total content of one or more selected from S and Se exceeds 0.010%, iron loss deterioration occurs because of incomplete desulfurization and deselenization in the secondary recrystallization annealing. Therefore, the total content of one or more selected from S and Se is set in a range of 0.001% or more and 0.010% or less.

Acid-Soluble Al: 0.003% or More and Less than 0.010%

Al forms a dense oxide film on the surface, which increases the difficulty of regulating the nitriding amount during the nitriding and hampers decarburization. Therefore, the Al content is limited to less than 0.010% in terms of acid-soluble Al. On the other hand, since Al has a high affinity for oxygen, adding a minute amount of Al during steelmaking is expected to reduce the amount of dissolved oxygen in the steel, thereby, for example, reducing oxide inclusions which cause deterioration in properties. In view of this, containing acid-soluble Al in an amount of 0.003% or more can suppress deterioration in magnetic properties.

N: Less than 0.006%

An excessively high N content increases the difficulty of secondary recrystallization, as with the case of S and Se. In particular, when the N content is 0.006% or more, secondary recrystallization is unlikely to occur and the magnetic properties are deteriorated. Therefore, the N content is limited to less than 0.006%. However, it is difficult to reduce the N content to less than 0.001% in industrial-scale production, so a content of 0.001% or more is acceptable.

The basic components of this disclosure have been described above. The balance other than the aforementioned components is Fe and inevitable impurities. In this disclosure, the following elements may also be appropriately added as required.

Ni: 0.005% or more and 1.5% or less, Cu: 0.005% or more and 1.5% or less, Sb: 0.005% or more and 0.5% or less, Sn: 0.005% or more and 0.5% or less, Cr: 0.005% or more and 0.1% or less, P: 0.005% or more and 0.5% or less, Mo: 0.005% or more and 0.5% or less, Ti: 0.0005% or more and 0.1% or less, Nb: 0.0005% or more and 0.1% or less, V: 0.0005% or more and 0.1% or less, B: 0.0002% or more and 0.0025% or less, Bi: 0.005% or more and 0.1% or less, Te: 0.0005% or more and 0.01% or less, Ta: 0.0005% or more and 0.01% or less Ni, Cu, Sb, Sn, Cr, P, Mo, Ti, Nb, V, B, Bi, Te and Ta are each a useful element in improving magnetic properties. When the content is less than the lower limit of the corresponding range as listed above, the effect of improving magnetic properties is insufficient. On the other hand, when the content exceeds the upper limit of the corresponding range as listed above, secondary recrystallization is unstable and magnetic properties are deteriorated. Therefore, it is acceptable to contain Ni: 0.005% or more and 1.5% or less, Cu: 0.005% or more and 1.5% or less, Sb: 0.005% or more and 0.5% or less, Sn: 0.005% or more and 0.5% or less, Cr: 0.005% or more and 0.1% or less, P: 0.005% or more and 0.5% or less, Mo: 0.005% or more and 0.5% or less, Ti: 0.0005% or more and 0.1% or less, Nb: 0.0005% or more and 0.1% or less, V: 0.0005% or more and 0.1% or less, B: 0.0002% or more and 0.0025% or less, Bi: 0.005% or more and 0.1% or less, Te: 0.0005% or more and 0.01% or less, and Ta: 0.0005% or more and 0.01% or less.

Next, the production method of this disclosure will be explained.

[Slab Heating]

A steel slab having the aforementioned chemical composition is heated. The slab heating temperature is 1300° C. or lower. Heating at a temperature exceeding 1300° C. requires a special heating furnace, such as an induction heating furnace, rather than a normal gas heating furnace, which is disadvantageous in various respects such as costs, productivity and yield rate. A too low slab heating temperature leads to incomplete uniformization of solute elements, and therefore the slab heating temperature is preferably 1200° C. or higher.

[Hot Rolling]

Hot rolling is performed after the slab heating. For example, the rolling reduction of the hot rolling is 95% or more, and the sheet thickness after the hot rolling is 1.5 mm to 3.5 mm. The rolling finish temperature is desirably 800° C. or higher. The coiling temperature after the hot rolling is desirably about 500° C. to 700° C.

This disclosure has a feature that the recrystallization ratio in the region of the sheet thickness ¼ layer of the hot-rolled steel sheet is 90% or less. Methods of obtaining a recrystallization ratio of 90% or less in the region of the sheet thickness ¼ layer of the hot-rolled steel sheet include lowering the friction coefficient in the final pass of the hot rolling, specifically to 0.35 or less. Methods of lowering the friction coefficient include increasing the amount of lubricant; reducing the roughness of rollers; and reducing the thickness of the surface-layer scale by, for example, an improved the descaling process or a shorter rolling time.

[Hot Band Annealing]

After the hot rolling, hot band annealing is performed to improve the texture of the hot-rolled sheet. The hot band annealing is preferably performed under conditions where the soaking temperature is 800° C. or higher and 1200° C. or lower, and the soaking time is 2 seconds or more and 300 seconds or less.

When the soaking temperature in the hot band annealing is lower than 800° C., the improvement in the texture of the hot-rolled sheet is incomplete, and non-recrystallized parts remain. As a result, the desired texture may not be obtained. On the other hand, when the soaking temperature exceeds 1200° C., dissolution of AlN, MnSe and MnS proceeds, the inhibiting capability of inhibitor in the secondary recrystallization process is weakened, and secondary recrystallization is suspended. As a result, magnetic properties are deteriorated. Therefore, the soaking temperature in the hot band annealing is preferably 800° C. or higher and 1200° C. or lower.

When the soaking time is less than 2 seconds, non-recrystallized parts remain because of the short high-temperature holding time, and the desired texture may not be obtained. On the other hand, when the soaking time exceeds 300 seconds, dissolution of AlN, MnSe and MnS proceeds, the aforementioned effects of N, acid-soluble Al, and S+Se, which are added in minute amounts, are weakened, and the texture after subjection to cold rolling becomes nonuniform. As a result, the magnetic properties of the sheet after subjection to secondary recrystallization annealing are deteriorated. Therefore, the soaking time in the hot band annealing is preferably 2 seconds or more and 300 seconds or less.

This disclosure has a further feature that, in the hot-rolled and annealed sheet, the average recrystallized grain size in regions from the outermost surface layer and the bottommost surface layer to a depth of ¼ the sheet thickness is three times or less the average recrystallized grain size in regions from the center of the sheet thickness to a length of less than ¼ the sheet thickness in directions to the outermost surface layer and the bottommost surface layer. The "average recrystallized grain size in regions from the outermost surface layer and the bottommost surface layer to a depth of ¼ the sheet thickness" here is obtained by measuring the average recrystallized grain size in a region from the outermost surface layer of the steel sheet to a depth of ¼ the sheet thickness and the average recrystallized grain size in a region from the bottommost surface layer of the steel sheet to a depth of ¼ the sheet thickness, and taking the larger one as the result. The method of measuring the average recrystallized grain size of the hot-rolled and annealed sheet was the same as the case of hot-rolled sheet, where samples were cut from the central portion in the width direction of the lead and tail ends of the coil, and measurement was performed by EBSD throughout the thickness of a cross section in the transverse direction (direction orthogonal to the rolling direction) (TD cross section). A region where the grain orientation spread (the average value of misorientation angles between one measurement point and all the other measurement points in the same crystal grain) is within 3° was regarded as a recrystallized grain.

[Cold Rolling]

After the hot band annealing, the steel sheet is subjected to cold rolling twice or more with intermediate annealing performed therebetween to obtain a steel sheet with a final sheet thickness. In this case, the intermediate annealing is preferably performed with a soaking temperature of 800° C. or higher and 1200° C. or lower and a soaking time of 2 seconds or more and 300 second or less, for the same reasons as in the hot band annealing.

By setting the rolling reduction in final cold rolling to 80% or more and 95% or less during the cold rolling, the sheet can obtain better texture after subjection to primary recrystallization annealing. It is also effective to perform the rolling with the rolling temperature increased to 100° C. to 250° C., or perform aging treatment once or more in a range of 100° C. to 250° C. during the cold rolling, in terms of developing Goss texture.

[Primary Recrystallization Annealing]

After the cold rolling, primary recrystallization annealing is performed preferably with a soaking temperature of 700° C. or higher and 1000° C. or lower. The primary recrystallization annealing may also serve as decarburization of the steel sheet by being performed in, for example, a wet hydrogen atmosphere. When the soaking temperature in the primary recrystallization annealing is lower than 700° C., non-recrystallized parts remain, and the desired texture may not be obtained. On the other hand, when the soaking temperature exceeds 1000° C., secondary recrystallization of Goss orientation grains may occur. Therefore, the soaking temperature in the primary recrystallization annealing is preferably set to 700° C. or higher and 1000° C. or lower. In the primary recrystallization annealing, the average heating rate in a temperature range of 500° C. to 700° C. is preferably 50° C./s.

[Application of Annealing Separator]

After the primary recrystallization annealing, an annealing separator may be applied to the steel sheet as required. In a case where iron loss is seriously considered and the formation of a forsterite film is needed, an annealing separator mainly composed of MgO may be applied, so that a forsterite film can be formed while developing secondary recrystallized texture during the subsequent secondary recrystallization annealing which also serves as purification annealing. In a case where punchability is seriously considered and no forsterite film is needed, no annealing separator is applied, or, even when applying an annealing separator, materials such as silica or alumina is used instead of the forsterite film-forming MgO. When applying these annealing separators, it is effective to perform, for example, electrostatic coating which introduces no moisture. A heat-resistant inorganic material sheet (silica, alumina, mica) may be used.

[Secondary Recrystallization Annealing]

Secondary recrystallization annealing is subsequently performed. The secondary recrystallization annealing is preferably performed, for example, at a temperature of 800° C. or higher for at least 20 hours. The annealing conditions of the secondary recrystallization annealing are not particularly limited, and any conventionally known annealing conditions may be applied. By using a hydrogen atmosphere as the annealing atmosphere, the secondary recrystallization annealing can also serve as purification annealing.

Subsequently, an insulating coating application process and a flattening annealing process may be performed as required, and the desired grain-oriented electrical steel sheet is obtained. The production conditions of the insulating coating application process and the flattening annealing process are not particularly limited, and any conventional methods may be used.

For example, in the insulating coating application process, the applied coating is mainly composed of glass, and that is commonly obtained by applying, for example, silicate phosphate with a coater.

In the flattening annealing process, if an annealing separator is applied in the preceding processes, then water washing, brushing, or pickling is performed to remove the remaining annealing separator. It is effective to subsequently perform flattening annealing to correct the shape to reduce iron loss. The soaking temperature in the flattening annealing is preferably about 700° C. to 900° C. from the perspective of shape correction.

A grain-oriented electrical steel sheet produced according to the aforementioned conditions has a very high magnetic flux density as well as low iron loss properties after the secondary recrystallization. A high magnetic flux density means that the grains have preferentially grown only in Goss orientation and its vicinity during the secondary recrystallization process. In the Goss orientation and its vicinity, the growth rate of secondary recrystallized grains is higher. Therefore, an increase in magnetic flux density indicates a potential increase in secondary recrystallized grain size. This is advantageous in terms of reducing hysteresis loss, yet disadvantageous in terms of reducing eddy current loss.

To solve such mutually contradictory phenomena against the ultimate goal of reducing iron loss, it is preferable to perform a magnetic domain refining treatment. By performing an appropriate magnetic domain refining treatment, the disadvantageous eddy current loss caused by the coarsening of secondary recrystallized grains is reduced. The reduction in eddy current loss as well as the reduction in hysteresis loss can lead to extremely low iron loss properties.

The magnetic domain refining treatment may be any known heat resistant or non-heat resistant magnetic domain refining treatment. However, by using a method of irradiating the steel sheet surface after the secondary recrystallization annealing with an electron beam or a laser, the effect of magnetic domain refining can reach the steel sheet inside in the sheet thickness direction. Hence, it is possible to obtain extremely low iron loss properties as compared with other magnetic domain refining treatment such as an etching method.

The other production conditions may comply with typical grain-oriented electrical steel sheet production methods.

EXAMPLES

Example 1

Steel slabs with a thickness of 220 mm having the respective chemical compositions listed in Table 2 were each heated to 1240° C. and then hot rolled to a thickness of 2.4 mm. The friction coefficient in the final pass of the hot rolling, and the area ratio of recrystallized grains in the region of the sheet thickness ¼ layer of the hot-rolled steel sheet taken from the lead and tail ends of the hot-rolled coil were measured. The results are listed in Table 2.

Subsequently, the hot-rolled sheets were each subjected to hot band annealing at 1000° C. for 60 seconds. The average recrystallized grain size in the region of the sheet thickness ¼ layer and the region of the sheet thickness central layer (the regions from the center of the sheet thickness to a length of less than ¼ the sheet thickness in directions to the outermost surface layer and the bottommost surface layer) of the hot-rolled and annealed sheets taken from the lead and tail ends of the hot band annealed coil were measured. The results are listed in Table 2. After the hot band annealing, the steel sheets were each subjected to first cold rolling to obtain an intermediate thickness of 1.8 mm. Subsequently, the steel sheets were each subjected to intermediate annealing at 1040° C. for 60 seconds, then to second cold rolling to obtain a thickness of 0.23 mm, and then to primary recrystallization annealing at 850° C. for 120 seconds. The heating rate from 500° C. to 700° C. in the primary recrystallization annealing was 100° C./s.

Subsequently, an annealing separator mainly composed of MgO was applied to the surface of each steel sheet, and then the steel sheets were subjected to secondary recrystallization annealing serving also as purification annealing at 1200° C. for 10 hours. Following this, a phosphate-based insulating tension coating was applied to and baked on each steel sheet, and flattening annealing was performed for the purpose of flattening the steel strips, to obtain products.

The results of examining the magnetic properties of each product obtained in this way are listed in Table 2.

TABLE 2

| No. | Si | C | Mn | sol.Al | N | S | Se | Others | Friction coefficient of final pass Lead end | Friction coefficient of final pass Tail end | Recrystallization ratio of sheet thickness ¼ layer (%) Lead end | Recrystallization ratio of sheet thickness ¼ layer (%) Tail end | Recrystallized grain size of hot band annealed sheet Hot rolled lead end Sheet thickness ¼ layer (µm) | Recrystallized grain size of hot band annealed sheet Hot rolled lead end Sheet thickness central layer (µm) | Recrystallized grain size of hot band annealed sheet Hot rolled lead end ¼ layer/Central layer | Recrystallized grain size of hot band annealed sheet Hot rolled tail end Sheet thickness ¼ layer (µm) | Recrystallized grain size of hot band annealed sheet Hot rolled tail end Sheet thickness central layer (µm) | Recrystallized grain size of hot band annealed sheet Hot rolled tail end ¼ layer/Central layer | Magnetic properties of product sheet W₁₇/₅₀ (W/kg) Hot rolled lead end | Magnetic properties of product sheet W₁₇/₅₀ (W/kg) Hot rolled tail end | Lead end – Tail end | Remarks |
|---|---|---|---|---|---|---|---|---|---|---|---|---|---|---|---|---|---|---|---|---|---|---|
| 1 | 1.56 | 0.012 | 0.08 | 0.008 | 0.004 | 0.002 | 0.004 | | 0.19 | 0.17 | 33 | 29 | 128 | 167 | 0.8 | 131 | 170 | 0.8 | 1.13 | 1.35 | −0.22 | Comparative example |
| 2 | 8.16 | 0.074 | 0.15 | 0.009 | 0.005 | 0.006 | 0.003 | | 0.19 | 0.17 | 41 | 39 | 127 | 148 | 0.9 | 135 | 155 | 0.9 | 1.56 | 1.62 | −0.06 | Comparative example |
| 3 | 3.16 | 0.001 | 0.07 | 0.003 | 0.004 | 0.006 | 0.002 | | 0.18 | 0.17 | 42 | 33 | 144 | 189 | 0.8 | 145 | 196 | 0.7 | 1.01 | 1.04 | −0.03 | Comparative example |
| 4 | 3.56 | 0.083 | 0.10 | 0.007 | 0.005 | 0.002 | 0.006 | | 0.18 | 0.16 | 40 | 37 | 49 | 31 | 1.6 | 51 | 31 | 1.6 | 1.76 | 1.80 | −0.04 | Comparative example |
| 5 | 3.71 | 0.051 | 0.01 | 0.006 | 0.005 | 0.006 | 0 | | 0.19 | 0.17 | 51 | 42 | 60 | 44 | 1.4 | 63 | 49 | 1.3 | 1.82 | 1.74 | 0.08 | Comparative example |
| 6 | 3.44 | 0.043 | 0.52 | 0.005 | 0.004 | 0.006 | 0.002 | | 0.18 | 0.17 | 38 | 44 | 92 | 155 | 0.6 | 98 | 162 | 0.6 | 1.53 | 1.59 | −0.06 | Comparative example |
| 7 | 3.56 | 0.056 | 0.12 | 0.002 | 0.005 | 0.002 | 0.002 | | 0.18 | 0.17 | 19 | 13 | 48 | 76 | 0.8 | 60 | 81 | 0.7 | 1.68 | 1.64 | 0.04 | Comparative example |
| 8 | 3.19 | 0.037 | 0.12 | 0.011 | 0.005 | 0.002 | 0.004 | | 0.19 | 0.18 | 27 | 22 | 63 | 108 | 0.6 | 66 | 110 | 0.6 | 1.73 | 1.69 | 0.04 | Comparative example |
| 9 | 3.56 | 0.023 | 0.17 | 0.005 | 0.007 | 0.003 | 0 | | 0.19 | 0.17 | 43 | 35 | 72 | 98 | 0.7 | 74 | 100 | 0.7 | 1.69 | 1.70 | −0.01 | Comparative example |
| 10 | 2.23 | 0.014 | 0.08 | 0.008 | 0.005 | 0 | 0 | | 0.21 | 0.20 | 39 | 40 | 120 | 119 | 1.0 | 122 | 131 | 0.9 | 1.03 | 1.00 | 0.03 | Comparative example |
| 11 | 3.21 | 0.011 | 0.09 | 0.009 | 0.004 | 0.014 | 0 | | 0.23 | 0.22 | 41 | 35 | 68 | 91 | 0.7 | 70 | 96 | 0.7 | 1.59 | 1.67 | −0.08 | Comparative example |
| 12 | 3.39 | 0.056 | 0.11 | 0.008 | 0.005 | 0 | 0.020 | | 0.19 | 0.18 | 31 | 29 | 46 | 38 | 1.2 | 51 | 39 | 1.3 | 1.71 | 1.65 | 0.06 | Comparative example |
| 13 | 3.20 | 0.058 | 0.10 | 0.009 | 0.005 | 0.007 | 0.005 | | 0.26 | 0.25 | 47 | 44 | 36 | 29 | 1.2 | 42 | 28 | 1.5 | 1.66 | 1.60 | 0.06 | Comparative |

TABLE 2-continued

| No. | Si | C | Mn | sol.Al | N | S | Se | Others | Friction coefficient of final pass Lead end | Friction coefficient of final pass Tail end | Recrystallization ratio of sheet thickness ¼ layer (%) Lead end | Recrystallization ratio of sheet thickness ¼ layer (%) Tail end | Recrystallized grain size of hot band annealed sheet Hot rolled lead end Sheet thickness ¼ layer (μm) | Recrystallized grain size of hot band annealed sheet Hot rolled lead end Sheet thickness central layer (μm) | Recrystallized grain size of hot band annealed sheet Hot rolled lead end ¼ layer/ Central layer | Recrystallized grain size of hot band annealed sheet Hot rolled tail end Sheet thickness ¼ layer (μm) | Recrystallized grain size of hot band annealed sheet Hot rolled tail end Sheet thickness central layer (μm) | Recrystallized grain size of hot band annealed sheet Hot rolled tail end ¼ layer/ Central layer | Magnetic properties of product sheet $W_{17/50}$ (W/kg) Hot rolled lead end | Magnetic properties of product sheet $W_{17/50}$ (W/kg) Hot rolled tail end | Magnetic properties of product sheet $W_{17/50}$ (W/kg) Lead end − Tail end | Remarks |
|---|---|---|---|---|---|---|---|---|---|---|---|---|---|---|---|---|---|---|---|---|---|---|
| 14 | 3.48 | 0.052 | 0.11 | 0.008 | 0.004 | 0.002 | 0 | | 0.38 | 0.37 | 93 | 92 | 404 | 118 | 3.4 | 392 | 114 | 3.4 | 0.82 | 1.04 | −0.22 | Comparative example |
| 15 | 3.25 | 0.013 | 0.09 | 0.008 | 0.004 | 0.002 | 0 | Ni: 0.2 V: 0.001 B: 0.0004 Te: 0.0013 | 0.35 | 0.34 | 88 | 84 | 130 | 155 | 0.8 | 139 | 166 | 0.8 | 0.88 | 0.87 | 0.01 | Example |
| 16 | 2.96 | 0.030 | 0.21 | 0.003 | 0.004 | 0.002 | 0 | | 0.18 | 0.17 | 50 | 36 | 109 | 132 | 0.8 | 111 | 136 | 0.8 | 0.87 | 0.86 | 0.01 | Example |
| 17 | 4.01 | 0.059 | 0.09 | 0.009 | 0.005 | 0.003 | 0.001 | Cu: 0.03 Sn: 0.12 Cr: 0.06 P: 0.02 Mo: 0.05 | 0.19 | 0.16 | 42 | 40 | 51 | 33 | 1.5 | 52 | 32 | 1.6 | 0.80 | 0.78 | 0.02 | Example |
| 18 | 6.56 | 0.072 | 0.06 | 0.008 | 0.003 | 0.004 | 0.002 | Sb: 0.03 Sn: 0.06 Ti: 0.0018 Nb: 0.0016 Ta: 0.0006 | 0.18 | 0.17 | 31 | 18 | 74 | 50 | 1.5 | 78 | 55 | 1.4 | 0.65 | 0.64 | 0.01 | Example |
| 19 | 3.91 | 0.055 | 0.11 | 0.007 | 0.005 | 0.002 | 0 | Sn: 0.10 Cr: 0.08 P: 0.04 Ti: 0.0010 Bi: 0.03 | 0.19 | 0.17 | 36 | 32 | 106 | 131 | 0.8 | 118 | 137 | 0.9 | 0.80 | 0.80 | 0.00 | Example |
| 20 | 3.68 | 0.051 | 0.10 | 0.006 | 0.004 | 0.003 | 0.003 | Ni: 0.5 P: 0.008 Ti: 0.0028 | 0.19 | 0.17 | 29 | 31 | 92 | 105 | 0.9 | 95 | 110 | 0.9 | 0.83 | 0.81 | 0.02 | Example |
| 21 | 3.43 | 0.046 | 0.12 | 0.008 | 0.005 | 0.002 | 0 | Sb: 0.006 Cr: 0.06 Mo: 0.02 Ta: 0.007 Ti: 0.003 | 0.19 | 0.17 | 22 | 14 | 93 | 102 | 0.9 | 94 | 113 | 0.8 | 0.85 | 0.83 | 0.02 | Example |
| 22 | 3.62 | 0.043 | 0.10 | 0.007 | 0.005 | 0.002 | 0.006 | Sn: 0.11 P: 0.05 Mo: 0.008 Ti: 0.003 Bi: 0.044 | 0.18 | 0.16 | 31 | 39 | 88 | 94 | 0.9 | 87 | 96 | 0.9 | 0.81 | 0.79 | 0.02 | Example |
| 23 | 3.44 | 0.037 | 0.08 | 0.008 | 0.005 | 0.002 | 0 | Cu: 0.12 Sb: 0.066 Mo: 0.02 | 0.18 | 0.17 | 36 | 31 | 106 | 121 | 0.9 | 108 | 137 | 0.8 | 0.82 | 0.80 | 0.02 | Example |

TABLE 2-continued

| No. | Chemical composition (mass %) | | | | | | | | Friction coefficient of final pass | | Recrystallization ratio of sheet thickness ¼ layer (%) | | Recrystallized grain size of hot band annealed sheet | | | | | | Magnetic properties of product sheet W₁₇/₅₀ (W/kg) | | | | Remarks |
| | Si | C | Mn | sol.Al | N | S | Se | Others | Lead end | Tail end | Lead end | Tail end | Hot rolled lead end | | | Hot rolled tail end | | | Hot rolled lead end | Hot rolled tail end | Lead end − Tail end | | |
| | | | | | | | | | | | | | Sheet thickness ¼ layer (μm) | Sheet thickness central layer (μm) | ¼ layer/ Central layer | Sheet thickness ¼ layer (μm) | Sheet thickness central layer (μm) | ¼ layer/ Central layer | | | | | |
| 24 | 3.50 | 0.056 | 0.08 | 0.006 | 0.004 | 0.002 | 0 | Cr: 0.008 P: 0.18 Nb: 0.04 V: 0.08 N: 0.0022 | 0.19 | 0.17 | 39 | 32 | 53 | 34 | 1.6 | 56 | 40 | 1.4 | 0.81 | 0.81 | 0.00 | Example |
| 25 | 3.43 | 0.036 | 0.08 | 0.007 | 0.004 | 0.002 | 0 | Cu: 0.08 Cr: 0.05 P: 0.07 Sb: 0.05 Mo: 0.01 Ti: 0.0014 | 0.18 | 0.16 | 41 | 30 | 101 | 135 | 0.7 | 114 | 139 | 0.8 | 0.81 | 0.79 | 0.02 | Example |
| 26 | 3.19 | 0.023 | 0.07 | 0.006 | 0.004 | 0 | 0.001 | Cu: 0.12 Cr: 0.06 Sb: 0.04 Mo: 0.02 Ti: 0.0012 Nb: 0.0033 | 0.19 | 0.17 | 46 | 42 | 91 | 111 | 0.8 | 93 | 118 | 0.8 | 0.79 | 0.76 | 0.03 | Example |

As indicated in Table 2, when the friction coefficient in the final pass of the hot rolling is 0.35 or less, the recrystallization ratio in the region of the sheet thickness ¼ layer of the hot-rolled steel sheet can be 90% or less, the average recrystallized grain size in the region of the sheet thickness ¼ layer of the hot-rolled and annealed sheet can be three times or less the average recrystallized grain size in the region of the sheet thickness central layer, and the variations in magnetic properties of the steel sheet after final annealing can be significantly reduced.

The invention claimed is:

1. A method of producing a grain-oriented electrical steel sheet having a secondary recrystallized structure in which grains have preferentially grown only in a Goss orientation and its vicinity during a secondary recrystallization process, comprising: preparing a hot-rolled steel sheet with a method of producing a hot-rolled steel sheet comprising:

preparing a steel slab having a chemical composition containing, by mass %, C: 0.002% or more and 0.080% or less, Si: 2.0% or more and 8.0% or less, Mn: 0.02% or more and 0.50% or less, acid-soluble Al: 0.003% or more and 0.009% or less, and at least one of S or Se: 0.001% or more and 0.010% or less in total, with N limited to less than 0.006%, and the balance being Fe and inevitable impurities;

heating the steel slab to 1300° C. or lower; and
  subjecting the steel slab to hot rolling, wherein a friction coefficient in final pass of the hot rolling is 0.35 or less;

subjecting the hot-rolled steel sheet to hot band annealing, and to cold rolling once, or twice or more with intermediate annealing performed therebetween, to obtain a cold-rolled steel sheet with a final sheet thickness;

subjecting the cold-rolled steel sheet to primary recrystallization annealing;

applying an annealing separator to a surface of the cold-rolled steel sheet after subjection to the primary recrystallization annealing; and then subjecting the cold-rolled steel sheet to secondary recrystallization annealing;

thereby producing the grain-oriented electrical steel sheet.

2. The method of producing the grain-oriented electrical steel sheet according to claim 1, wherein content of acid-soluble Al in the steel slab is 0.003% or more and 0.005% or less.

3. The method of producing the grain-oriented electrical steel sheet according to claim 1, wherein the friction coefficient in final pass of the hot rolling is 0.30 or less.

4. The method of producing the grain-oriented electrical steel sheet according to claim 1, wherein the friction coefficient in final pass of the hot rolling is 0.26 or less.

5. A method of producing a grain-oriented electrical steel sheet having a secondary recrystallized structure in which grains have preferentially grown only in a Goss orientation and its vicinity during a secondary recrystallization process, comprising: preparing a hot-rolled steel sheet with a method of producing a hot-rolled steel sheet comprising:

preparing a steel slab having a chemical composition containing, by mass %, C: 0.002% or more and 0.080% or less, Si: 2.0% or more and 8.0% or less, Mn: 0.02% or more and 0.50% or less, acid-soluble Al: 0.003% or more and 0.009% or less, and at least one of S or Se: 0.001% or more and 0.010% or less in total, and with N limited to less than 0.006%, and at least one selected from, by mass %, Ni: 0.005% or more and 1.5% or less,
Cu: 0.005% or more and 1.5% or less,
Sb: 0.005% or more and 0.5% or less,
Sn: 0.005% or more and 0.5% or less,
Cr: 0.005% or more and 0.1% or less,
P: 0.005% or more and 0.5% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less, the balance being Fe and inevitable impurities;

heating the steel slab to 1300° C. or lower; and subjecting the steel slab to hot rolling, wherein a friction coefficient in final pass of the hot rolling is 0.35 or less;

subjecting the hot-rolled steel sheet to hot band annealing, and to cold rolling once, or twice or more with intermediate annealing performed therebetween, to obtain a cold-rolled steel sheet with a final sheet thickness;

subjecting the cold-rolled steel sheet to primary recrystallization annealing;

applying an annealing separator to a surface of the cold-rolled steel sheet after subjection to the primary recrystallization annealing; and then subjecting the cold-rolled steel sheet to secondary recrystallization annealing;

thereby producing the grain-oriented electrical steel sheet.

6. The method of producing the grain-oriented electrical steel sheet according to claim 5, wherein the chemical composition of acid-soluble Al in the steel slab is 0.003% or more and 0.005% or less.

7. The method of producing the grain-oriented electrical steel sheet according to claim 5, wherein the friction coefficient in final pass of the hot rolling is 0.30 or less.

8. The method of producing the grain-oriented electrical steel sheet according to claim 5, wherein the friction coefficient in final pass of the hot rolling is 0.26 or less.

* * * * *